(12) United States Patent
Morimoto et al.

(10) Patent No.: US 9,395,448 B2
(45) Date of Patent: Jul. 19, 2016

(54) INFORMATION INDICATION APPARATUS

(71) Applicant: TOYOTA JIDOSHA KABUSHIKI KAISHA, Toyota-shi, Aichi-ken (JP)

(72) Inventors: Kazuhiro Morimoto, Toyota (JP); Katsuhiro Matsuoka, Nagakute (JP); Yoshikazu Toyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/870,890

(22) Filed: Sep. 30, 2015

(65) Prior Publication Data

US 2016/0139274 A1     May 19, 2016

(30) Foreign Application Priority Data

Nov. 13, 2014    (JP) ................................ 2014-230969

(51) Int. Cl.
    *B60W 30/12*      (2006.01)
    *G01S 19/51*      (2010.01)
    *B60Q 9/00*       (2006.01)

(52) U.S. Cl.
    CPC ................. *G01S 19/51* (2013.01); *B60Q 9/008* (2013.01)

(58) Field of Classification Search
    CPC . B60R 2300/302; B60W 30/12; G01C 21/30; G01C 21/36
    See application file for complete search history.

(56) References Cited

U.S. PATENT DOCUMENTS

| 7,639,841 | B2 * | 12/2009 | Zhu | G06K 9/00335 340/435 |
| 8,553,087 | B2 * | 10/2013 | Yanai | B60R 1/00 348/148 |
| 8,812,226 | B2 * | 8/2014 | Zeng | G01S 13/723 382/103 |
| 8,868,333 | B2 * | 10/2014 | Bartels | G01C 21/30 701/300 |
| 2002/0087269 | A1 * | 7/2002 | Sasaki | B60R 1/00 701/301 |

FOREIGN PATENT DOCUMENTS

JP      2013-175057      9/2013

* cited by examiner

*Primary Examiner* — Thomas Tarcza
*Assistant Examiner* — Alex C Dunn
(74) *Attorney, Agent, or Firm* — Oliff PLC

(57) ABSTRACT

An information indication apparatus installed in a vehicle, includes a vehicle's information obtainment unit to obtain a position of the vehicle; another vehicle's information obtainment unit to obtain a position of the other vehicle by inter-vehicle communication; a relative position calculation unit to calculate a relative position of the other vehicle; and an indication unit to indicate one of areas, which represent ranges of directional angles as viewed from the vehicle, that includes the existence direction of the other vehicle, when the distance is less than or equal to a first threshold, and the other vehicle is traveling towards the vehicle. When the distance is less than or equal to a second threshold set to be less than the first threshold, the indication unit does not change the area to be indicated even if the existence direction of the other vehicle changes to be included in another area.

3 Claims, 7 Drawing Sheets

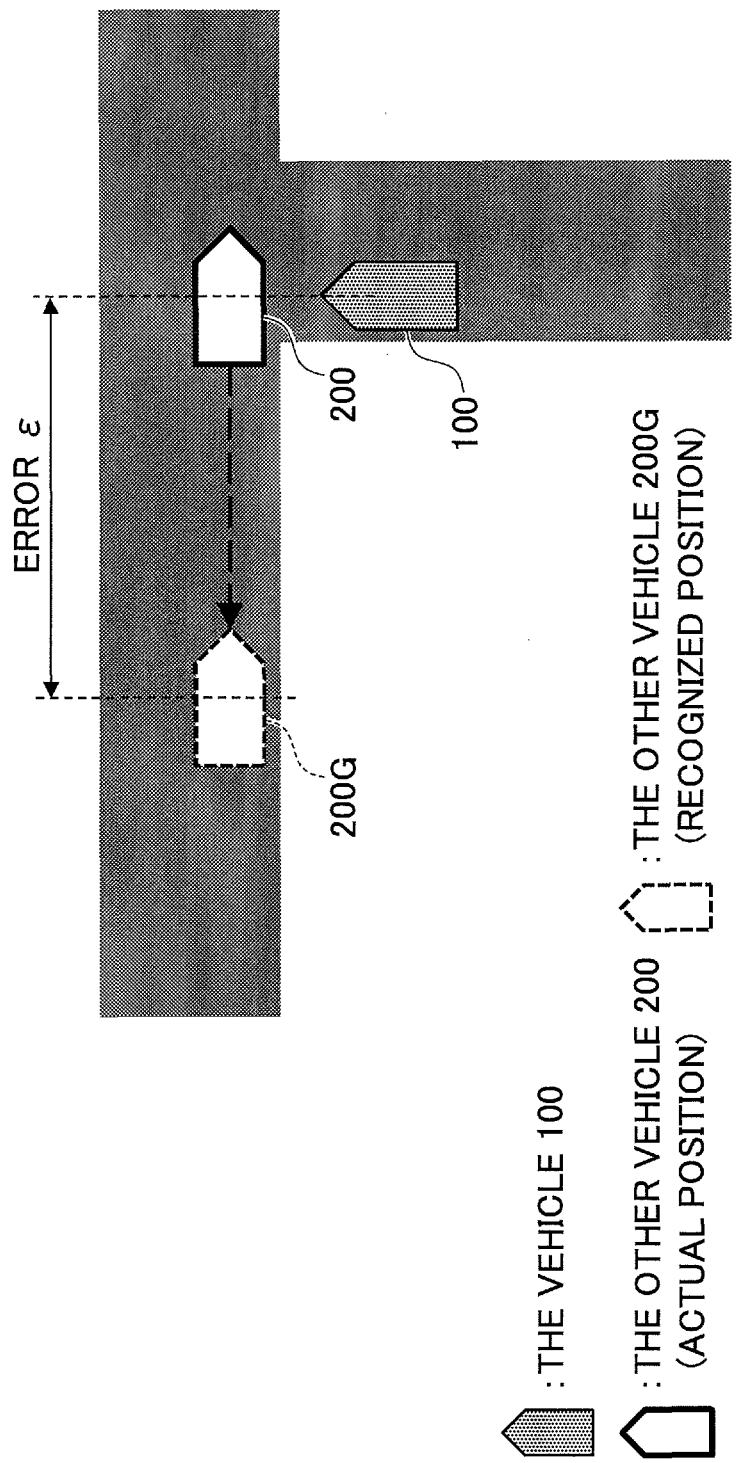

INFORMATION INDICATION APPARATUS

FIELD

The disclosures herein generally relate to an information indication apparatus that is installed in a vehicle to indicate a direction in which another vehicle approaching the vehicle exists.

BACKGROUND

Conventionally, a technology has been known that indicates a direction in which another vehicle approaching the vehicle exists, based on the vehicle information about the position and traveling direction of the vehicle, and the other vehicle information about the position and traveling direction of the other vehicle obtained by inter-vehicle communication (see, for example, Patent Document 1).

RELATED-ART DOCUMENTS

Patent Documents

[Patent Document 1] Japanese Laid-open Patent Publication No. 2013-175057

However, the position of the vehicle and the position of the other vehicle may include errors. Therefore, depending on detection precision of the position of the vehicle and the position of the other vehicle, even though the direction in which the other vehicle actually exists does not change, the direction to be indicated as an existing direction of the other vehicle may be changed. Especially, in a circumstance where the distance between the vehicle and the other vehicle is comparatively short, it is often the case that the driver of the vehicle can visually observe the other vehicle. Therefore, in such a circumstance, if the direction to be indicated as an existing direction of the other vehicle is changed, it may give the driver a sense of discomfort.

Thereupon, in view of the above, it is an object of at least one of embodiments of the present invention to provide an information indication apparatus that indicates a direction in which the other vehicle approaching the vehicle exists, based on the other vehicle information obtained by inter-vehicle communication, without giving a sense of discomfort to the driver caused by changing the direction to be indicated as an existing direction of the other vehicle, in a circumstance where the distance between the vehicle and the other vehicle is comparatively short.

SUMMARY

According to at least one of embodiments of the present invention, an information indication apparatus, configured to be installed in a vehicle, includes a vehicle's information obtainment unit configured to obtain positional information of the vehicle, including a position and a traveling direction of the vehicle; another vehicle's information obtainment unit configured to obtain positional information of the other vehicle, including a position and a traveling direction of the other vehicle, by inter-vehicle communication with the other vehicle; a relative position calculation unit configured, based on the vehicle's positional information and the other vehicle's positional information, to calculate a relative position of the other vehicle relative to the vehicle, the relative position including a distance between the vehicle and the other vehicle, and a direction in which the other vehicle exists as viewed from the vehicle; and an indication unit configured to indicate, among a plurality of predetermined areas each of which is represented by a range of directional angles as viewed from the vehicle, one of the predetermined areas including the direction in which the other vehicle exists, when the distance is less than or equal to a predetermined first threshold, and the other vehicle is traveling towards the vehicle. When the distance is less than or equal to a predetermined second threshold set to be less than the predetermined first threshold, the indication unit does not change the one of the predetermined areas to be indicated even if the direction in which the other vehicle exists changes to be included in another of the predetermined areas.

According to at least one of embodiments of the present invention, it is possible to provide an information indication apparatus that indicates a direction in which the other vehicle approaching the vehicle exists, based on the other vehicle information obtained by inter-vehicle communication, without giving a sense of discomfort to the driver caused by changing the direction to be indicated as an existing direction of the other vehicle, in a circumstance where the distance between the vehicle and the other vehicle is comparatively short.

BRIEF DESCRIPTION OF DRAWINGS

FIG. 8 is a diagram that illustrates operations of an information indication apparatus (ECU) according to an embodiment of the present invention.

DESCRIPTION OF EMBODIMENTS

In the following, embodiments of the present invention will be described with reference to the drawings.

First, a configuration of an information indication apparatus 1 will be described according to the present embodiment.

Figure 1:
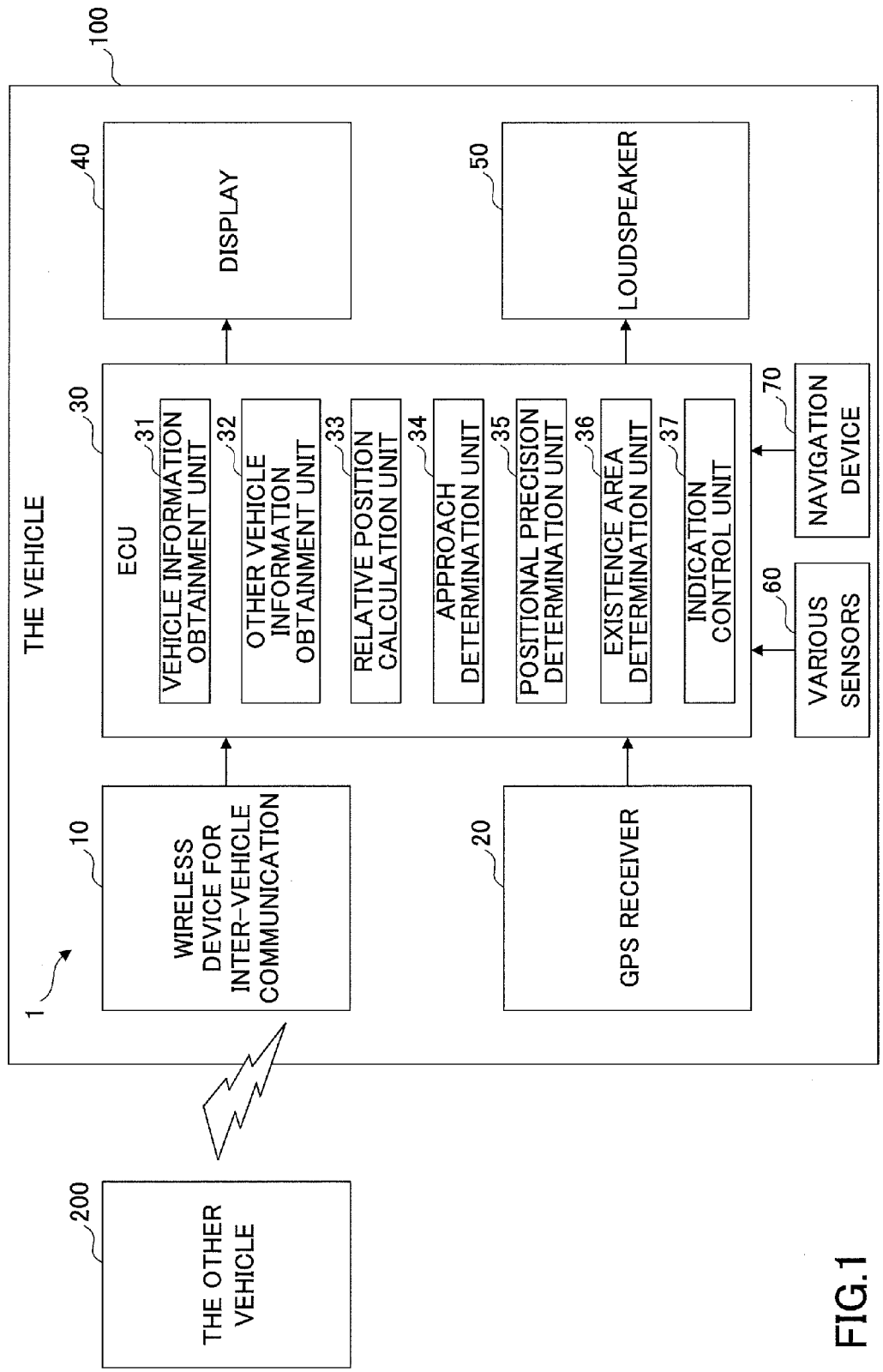
FIG. 1 is a block diagram that illustrates an example of a configuration of an information indication apparatus.

FIG. 1 is a block diagram that illustrates an example of a configuration of the information indication apparatus 1.

Based on inter-vehicle communication between a vehicle 100 and another vehicle 200 that exists around the vehicle 100, the information indication apparatus 1 installed in the vehicle 100 executes drive support that indicates a direction in which the other vehicle 200 approaching the vehicle 100 exists.

The information indication apparatus 1 includes a wireless device for inter-vehicle communication 10, a GPS (Global Positioning System) receiver 20, an ECU (Electric Control Unit) 30, a display 40, a loudspeaker 50, various sensors 60, and a navigation device 70 that are installed in the vehicle 100.

Note that the following description assumes that the other vehicle 200, which executes inter-vehicle communication with the vehicle 100, has substantially the same configuration as the vehicle 100.

The wireless device for inter-vehicle communication 10 is a communication unit that receives and transmits information bidirectionally with the other vehicle 200 that exists around the vehicle 100, by predetermined wireless communication. The wireless device for inter-vehicle communication 10 receives the other vehicle's positional information including the position and traveling direction (head direction of the other vehicle 200) of the other vehicle 200 that are transmitted from the other vehicle 200. The wireless device for inter-vehicle communication 10 also receives information (the other vehicle's positional precision information) about precision of the other vehicle's positional information (the other vehicle's positional precision information) that is transmitted from the other vehicle 200. The wireless device for inter-vehicle communication 10 is connected with the ECU 30 via an in-vehicle LAN or the like to communicate with each other, and when receiving the other vehicle's positional information, the other vehicle's positional precision information, and the like, transmits them to the ECU 30. Also, the wireless device for inter-vehicle communication 10 transmits the vehicle's positional information including the position and traveling direction (head direction of the vehicle 100) and the like of the vehicle 100 transmitted from the ECU 30, information about the precision of the vehicle's positional information (the vehicle's positional precision information), and the like, to the other vehicle 200. Note that the other vehicle's positional precision information and the vehicle's positional precision information will be described later in detail.

The GPS receiver 20 is a communication unit that receives GPS signals from multiple GPS satellites (for example, four) that exist in space above the vehicle 100. Based on these GPS signals, the GPS receiver 20 calculates the position (latitude and longitude) of the vehicle 100. The GPS receiver 20 is connected with the ECU 30 via an in-vehicle LAN or the like to communicate with each other, and transmits calculated information about the position of the vehicle 100 to the ECU 30.

The GPS receiver 20 also transmits information about the number of GPS satellites whose GPS signals can be received, their places (directions), strengths (S/N ratios) of the GPS signals, and calculated precision of the position of the vehicle 100, to the ECU 30.

The ECU 30 is an electronic control unit that executes main control processes in the information indication apparatus 1. The ECU 30 is configured, for example, with a microcomputer, and may execute various control processes, which will be described later, by executing various programs stored in a ROM on a CPU. The ECU 30 includes, as functional units, a vehicle information obtainment unit 31, another vehicle information obtainment unit 32, a relative position calculation unit 33, an approach determination unit 34, a positional precision determination unit 35, an existence area determination unit 36, and an indication control unit 37. Note that respective functions of the vehicle information obtainment unit 31, the other vehicle information obtainment unit 32, the relative position calculation unit 33, the approach determination unit 34, the positional precision determination unit 35, the existence area determination unit 36, and the indication control unit 37 may be implemented by executing corresponding programs stored in a ROM on a CPU.

The vehicle information obtainment unit 31 obtains the vehicle's positional information including the position and traveling direction (head direction of the vehicle 100) of the vehicle 100. Note that "obtaining" the position and traveling direction of the vehicle 100 means obtaining the position and traveling direction of the vehicle 100 by any arbitrary actions of receiving, calculating, generating, correcting, and the like.

More specifically, the vehicle information obtainment unit 31 receives the position (latitude and longitude) of the vehicle 100 from the GPS receiver 20. Also, the vehicle information obtainment unit 31 may correct the position of the vehicle 100 received from the GPS receiver 20, based on a travel trajectory calculated from detected signals (vehicle speed signal, steering angle signal, yaw rate signal, etc.) about motional states of the vehicle 100 that are received from a vehicle speed sensor, a steering angle sensor, a yaw rate sensor, etc., included in the various sensors 60. Also, the vehicle information obtainment unit 31 may correct the position of the vehicle 100 received from the GPS receiver 20, based on map information received from the navigation device 70. Also, if the GPS receiver 20 cannot receive GPS signals due to an influence of weather, a tunnel, and the like, and cannot calculate the position of the vehicle 100, the vehicle information obtainment unit 31 may calculate (estimate) the position of the vehicle 100, based on detected signals received from the vehicle speed sensor, the steering angle sensor, and the yaw rate sensor included in the various sensors 60, and map information or the like received from the navigation device 70, with respect to the position of the vehicle 100 that has been obtained most recently. Also, the vehicle information obtainment unit 31 calculates the traveling direction of the vehicle 100, based on a time series of obtained positions of the vehicle 100 (for example, the position of the vehicle 100 obtained for a current time, and the position of the vehicle 100 obtained for the previous time). Also, the vehicle information obtainment unit 31 may correct the traveling direction of the vehicle 100, based on a directional signal received from a direction sensor included in the various sensors 60, map information received from the navigation device 70, and the like.

Note that, in the following, the position of the vehicle 100, and the traveling direction of the vehicle 100 obtained by the vehicle information obtainment unit 31 will be referred to as the "estimated position of the vehicle 100", and the "estimated traveling direction of the vehicle 100", respectively.

Also, the vehicle information obtainment unit 31 obtains information about precision (the vehicle's positional precision information) of the obtained vehicle positional information (estimated position and estimated traveling direction of the vehicle 100). The vehicle's positional precision information includes precision information about the estimated position of the vehicle 100 (the vehicle's estimated positional precision information) and precision information about the estimated traveling direction of the vehicle 100 (the vehicle's estimated traveling direction precision information). Note that "obtaining" the vehicle's positional precision information means obtaining the vehicle's positional precision information by any arbitrary actions of receiving, calculating, generating, correcting, and the like.

Note that the vehicle's positional precision information is, for example, simply an expected error, of the obtained vehicle positional information (estimated position and estimated traveling direction of the vehicle 100), or information that represents a precision level in multiple stepped levels that are set corresponding to errors. Also, in the following, a "positional error" may be represented by an error circle or oval covering deviation from a true position on a horizontal surface, which may be a circle having a uniform error in all directions in 360°, or may be an oval having different errors depending on directions.

More specifically, the precision of the position of the vehicle 100 calculated by the GPS receiver 20 changes depending on the number of GPS satellites whose GPS signals can be received by the GPS receiver 20, their places, and the strengths (S/N ratios) of the respective GPS signals. Therefore, the vehicle information obtainment unit 31 may generate and obtain the vehicle's positional precision information, based on the number of GPS satellites whose GPS signals can be received by the GPS receiver 20, their places (directions), and the strengths (S/N ratios) of the respective GPS signals. For example, a map is stored in an internal memory of the ECU 30 that defines in advance a correspondence relationship between positional errors of the vehicle 100 calculated by the GPS receiver 20, and precision parameters including the number of GPS satellites whose GPS signals can be received, their places, and the strengths (S/N ratios) of the respective GPS signals. This makes it possible for the vehicle information obtainment unit 31 to generate the vehicle's positional precision information based on the map.

Also, the precision of the estimated position of the vehicle 100 is improved by correcting the position of the vehicle 100 calculated by the GPS receiver 20 so that it is positioned on a travel trajectory of the vehicle 100 that is calculated based on the detected signals of the vehicle speed sensor, the steering angle sensor, the yaw rate sensor, and the like included in the various sensors 60. Also, the precision of the estimated position of the vehicle 100 is improved by correcting the position of the vehicle 100 calculated by the GPS receiver 20 so that it is positioned on a road corresponding to the map information transmitted from the navigation device 70. Therefore, the vehicle information obtainment unit 31 may generate and obtain the vehicle's positional precision information depending on whether a correction has been applied to the position of the vehicle 100 received from the GPS receiver 20, and contents of the correction. For example, a map is stored in an internal memory of the ECU 30 that defines in advance a correspondence relationship between the contents of corrections (a correction based on the detected signals including the vehicle speed sensor, the steering angle sensor, the yaw rate sensor, and the like, a correction based on map information and the like), and degrees of precision improvement (reduced amount of error) of the estimated position of the vehicle 100. This makes it possible for the vehicle information obtainment unit 31 to generate the vehicle's positional precision information based on the map.

Also, if the GPS receiver 20 cannot calculate the position of the vehicle 100 as described above, the vehicle information obtainment unit 31 may calculate the position of the vehicle 100, based on the detected signals received from the vehicle speed sensor, the steering angle sensor, and the yaw rate sensor included in the various sensors 60, and the map information or the like received from the navigation device 70, with respect to the position of the vehicle 100 that has been obtained most recently. In this case, depending on detected errors of the vehicle speed sensor, the steering angle sensor, the yaw rate sensor, and the like, calculated precision of the estimated position of the vehicle 100 may be degraded. Especially, if a period continues for a while during which the GPS receiver 20 cannot receive GPS signals, the precision of the estimated position of the vehicle 100 may be degraded more. Therefore, the vehicle information obtainment unit 31 may generate and obtain the vehicle's positional precision information depending on detected errors of the vehicle speed sensor, the steering angle sensor, the yaw rate sensor, and the like, and a period during which the GPS receiver 20 cannot receive GPS signals. For example, a map is stored in an internal memory of the ECU 30 that defines in advance a correspondence relationship between degrees of precision degradation (increased amount of error) of the estimated position of the vehicle 100 expected from detected errors of the vehicle speed sensor, the steering angle sensor, the yaw rate sensor, and the like, and periods during which the GPS receiver 20 cannot receive GPS signals. This makes it possible for the vehicle information obtainment unit 31 to generate the vehicle's positional precision information based on the map.

Also, as described above, the vehicle information obtainment unit 31 calculates the estimated traveling direction of the vehicle 100 based on a time series of estimated positions of the vehicle 100, and hence, generates the vehicle's estimated traveling direction precision information depending on the vehicle's positional precision information.

Also, the precision of the estimated position of the vehicle 100 is improved by correcting the position of the vehicle 100 calculated based on a time series of estimated positions of the vehicle 100, based on a directional signal from the direction sensor and the map information or the like from the navigation device 70. Therefore, the vehicle information obtainment unit 31 may generate and obtain the vehicle's estimated traveling direction precision information depending on whether a correction has been applied, and contents of the correction. For example, a map is stored in an internal memory of the ECU 30 that defines in advance a correspondence relationship between contents of corrections (a correction based on a directional signal from the direction sensor, and a correction based on the map information or the like), and degrees of precision improvement (reduced amount of error) of the estimated traveling direction of the vehicle 100. This makes it possible for the vehicle information obtainment unit 31 to generate the vehicle's positional precision information based on the map.

The other vehicle information obtainment unit 32 obtains the other vehicle's positional information including the position and traveling direction (head direction of the other vehicle 200) and the like of the other vehicle 200 that exists around the vehicle 100. The other vehicle information obtainment unit 32 obtains the position (latitude and longitude) and traveling direction (head direction of the other vehicle 200) of the other vehicle 200 from the wireless device for inter-vehicle communication 10.

Note that, in the following, similarly to the case of the vehicle 100, the position of the other vehicle 200 and the traveling direction of the other vehicle 200 obtained by the other vehicle information obtainment unit 32 will be referred to as the "estimated position of the other vehicle 200", and the "estimated traveling direction of the other vehicle 200".

Also, the other vehicle information obtainment unit 32 obtains information about precision (the other vehicle's positional precision information) of the obtained other vehicle's positional information (the estimated position and the estimated traveling direction of the other vehicle 200). The other vehicle's positional precision information includes precision information about the estimated position of the other vehicle 200 (the other vehicle's estimated positional precision information) and precision information about the estimated traveling direction of the other vehicle 200 (the other vehicle's estimated traveling direction precision information).

Note that the other vehicle's positional precision information is substantially the same as the vehicle's positional precision information except that the object is switched from the vehicle 100 to the other vehicle 200, which may be generated by the other vehicle 200 with the methods used for generating the vehicle's positional precision information described above.

Based on the vehicle's positional information obtained by the vehicle information obtainment unit 31 and the other vehicle's positional information obtained by the other vehicle information obtainment unit 32, the relative position calculation unit 33 calculates the relative position of the other vehicle 200 as viewed from the vehicle 100 (for example, a distance D between the vehicle 100 and the other vehicle 200, and a direction of the other vehicle 200 as viewed from the vehicle 100).

Note that, in the following, the relative position of the other vehicle 200 as viewed from the vehicle 100 will be simply referred to as "the relative position of the other vehicle 200", the relative position of the other vehicle 200 calculated by the relative position calculation unit 33 will be referred to as the "estimated relative position of the other vehicle 200".

The approach determination unit 34 determines whether the other vehicle 200 is a vehicle that is approaching the vehicle 100. Specifically, if the distance D between the vehicle 100 and the other vehicle 200 calculated by the relative position calculation unit 33 is within a first threshold Dth1, and the other vehicle 200 is traveling towards the vehicle 100, the approach determination unit 34 determines that the other vehicle 200 is approaching the vehicle 100.

The approach determination unit 34 may determine whether the other vehicle 200 is traveling towards the vehicle 100, based on the vehicle's positional information and the other vehicle's positional information obtained by the vehicle information obtainment unit 31 and the other vehicle information obtainment unit 32, respectively. For example, the approach determination unit 34 may determine that the other vehicle 200 is approaching the vehicle 100 if a half-line that extends from the estimated position of the vehicle 100 in its estimated traveling direction, crosses a half-line that extends from the estimated position of the other vehicle 200 in its estimated traveling direction, in a range within the first threshold Dth1 from the estimated position of the vehicle 100. Also, the approach determination unit 34 may determine that the other vehicle 200 is traveling towards the vehicle 100, if the estimated position of the vehicle 100 is included within a range of predetermined directional angles, with respect to the estimated traveling direction of the other vehicle 200 as viewed from the estimated position of the other vehicle 200.

Also, the approach determination unit 34 may determine whether the other vehicle 200 is traveling towards the vehicle 100, based on a history of the estimated relative positions of the other vehicle 200 in a predetermined period. For example, the approach determination unit 34 may calculate a relative trajectory of the other vehicle 200 as viewed from the vehicle 100, by using a history of the estimated relative positions of the other vehicle 200, to determine whether the other vehicle 200 is traveling towards the vehicle 100 from the relative trajectory.

Also, the approach determination unit 34 may determine whether the other vehicle 200 is traveling towards the vehicle 100, based on the map information or the like received from the navigation device 70. For example, assume that roads on which the vehicle 100 and the other vehicle 200 are traveling are identified, respectively, based on the map information, and the vehicle 100 and the other vehicle 200 continue to travel in the respective estimated traveling directions. If the roads cross with each other in a range in the first threshold Dth1 from the estimated position of the vehicle 100, the approach determination unit 34 may determine that the other vehicle 200 is traveling towards the vehicle 100.

Note that, in the following, the distance D between the vehicle 100 and the other vehicle 200 calculated by the relative position calculation unit 33 will be referred to as the "estimated distance D between the vehicle 100 and the other vehicle 200".

The positional precision determination unit 35 determines whether the precision of the estimated position of the vehicle 100 (the vehicle's estimated positional precision), the precision of the estimated position of the other vehicle 200 (the other vehicle's estimated positional precision), and the precision of the estimated relative position of the other vehicle 200 (estimated relative positional precision) are greater than or equal to predetermined references, respectively.

Note that the positional precision determination unit 35 may calculate the estimated relative positional precision, based on the vehicle's positional precision information obtained by the vehicle information obtainment unit 31, and the other vehicle's positional precision information obtained by the other vehicle information obtainment unit 32. For example, the positional precision determination unit 35 may calculate the estimated relative positional precision as the mean square of the error of the estimated position of the vehicle 100 based on the vehicle's positional precision information and the error of the estimated position of the other vehicle 200 based on the other vehicle's positional precision information. Also, if at least one of the error of the estimated position of the vehicle 100 and the error of the estimated position of the other vehicle 200, changes the value depending on a direction on a horizontal surface that can be represented by an error oval relative to a true position, the error of the estimated relative position of the other vehicle 200 included in the estimated relative positional precision may change the value depending on a direction in which the other vehicle 200 exists.

Based on the relative position of the other vehicle 200 calculated by the relative position calculation unit 33, the existence area determination unit 36 determines, among multiple existence areas that represent directions in which the other vehicle may exist as viewed from the vehicle 100 (for the sake of simplicity, simply referred to as the "direction in which the other vehicle 200 exists" below), which existence area includes the direction in which the other vehicle 200 exists. The multiple existence areas that represent directions in which the other vehicle may exist as viewed from the vehicle 100 will be described using FIG. 2.

Figure 2:
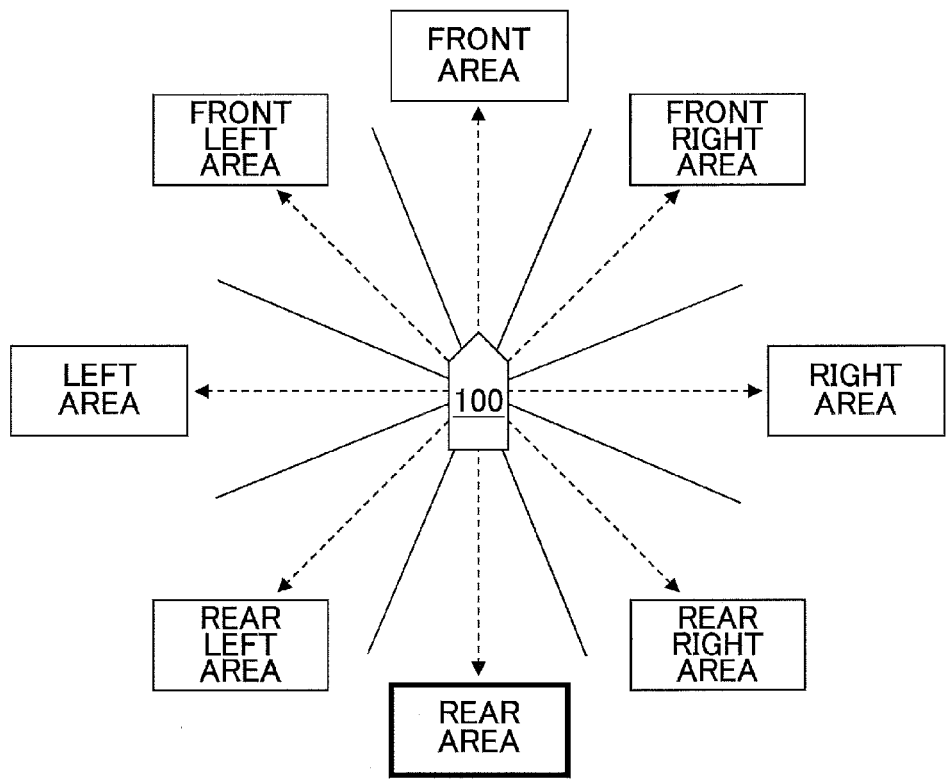
FIG. 2 is a diagram that illustrates an example of multiple existence areas that represent directions in which the other vehicle may exist.

FIG. 2 is a diagram that illustrates an example of multiple existence areas that represent directions in which the other vehicle may exist.

In this example, directions around 360° on a horizontal surface as viewed from the vehicle 100 are partitioned into eight existence areas ("front area", "front right area", "right area", "rear right area", "rear area", "rear left area", "left area", and "front left area").

The front area is set to a range of predetermined directional angles relative to the forward direction of the vehicle 100 as a reference (for example, an angle range of 45° having the directional angle corresponding to the forward direction of the vehicle 100 at the center).

The front right area is set to a range of predetermined directional angles relative to the right forward direction (the 45° direction between the forward direction and the right direction) of the vehicle 100 as a reference (for example, an angle range of 45° having the directional angle corresponding to the right forward direction of the vehicle 100 at the center).

The right area is set to a range of predetermined directional angles relative to the right direction of the vehicle 100 as a reference (for example, an angle range of 45° having the directional angle corresponding to the right direction of the vehicle 100 at the center).

The rear right area is set to a range of predetermined directional angles relative to the right backward direction (the 45° direction between the backward direction and the right direction) of the vehicle 100 as a reference (for example, an angle range of 45° having the directional angle corresponding to the right backward direction of the vehicle 100 at the center).

The rear area is set to a range of predetermined directional angles relative to the backward direction of the vehicle 100 as a reference (for example, an angle range of 45° having the directional angle corresponding to the backward direction of the vehicle 100 at the center).

The rear left area is set to a range of predetermined directional angles relative to the left backward direction (the 45° direction between the backward direction and the left direction) of the vehicle 100 as a reference (for example, an angle range of 45° having the directional angle corresponding to the left backward direction of the vehicle 100 at the center).

The left area is set to a range of predetermined directional angles relative to the left direction of the vehicle 100 as a reference (for example, an angle range of 45° having the directional angle corresponding to the left direction of the vehicle 100 at the center).

The front left area is set to a range of predetermined directional angles relative to the left forward direction (the 45° direction between the forward direction and the left direction) of the vehicle 100 as a reference (for example, an angle range of 45° having the directional angle corresponding to the left forward direction of the vehicle 100 at the center).

Based on the relative position of the other vehicle 200 calculated by the relative position calculation unit 33, the existence area determination unit 36 determines which existence area includes (corresponds to) the direction in which the other vehicle 200 exists.

The indication control unit 37 executes various control processes to indicate the existence area that corresponds to the direction in which the other vehicle 200 exists (the existence area determined by the existence area determination unit 36), which is an object to be indicated to the driver or the like of the vehicle 100. The indication control unit 37 controls the display 40 and the loudspeaker 50 that are connected for communication via an in-vehicle LAN, a direct line or the like, to indicate the direction in which the other vehicle 200 exists, namely, the existence area determined by the existence area determination unit 36, to the driver or the like of the vehicle 100. Specifically, the indication control unit 37 generates a signal (display image signal) that corresponds to a display image for indicating the existence area corresponding to the direction in which the other vehicle 200 exists, and transmits the image to the display 40, and also generates a sound signal to indicate the existence area corresponding to the direction in which the other vehicle 200 exists, and transmits the sound to the loudspeaker 50. In the following, the existence area corresponding to the direction in which the other vehicle 200 exists will be simply referred to as "the existence area of the other vehicle 200".

Note that if the existence area determined by the existence area determination unit 36 is the rear area, the indication control unit 37 does not indicate the existence area of the other vehicle 200 to the driver or the like through the display 40 and the loudspeaker 50. This is because the other vehicle 200 that exists in the rear area is considered to be a following vehicle of the vehicle 100. More specifically, it is possible for the driver of the vehicle 100 to check a following vehicle in advance by a door mirror, a rear-view mirror in the vehicle compartment, and the like. Therefore, the driver may feel it tiresome if he/she is informed of the direction in which the other vehicle 200 as the following vehicle exists.

Figure 3:
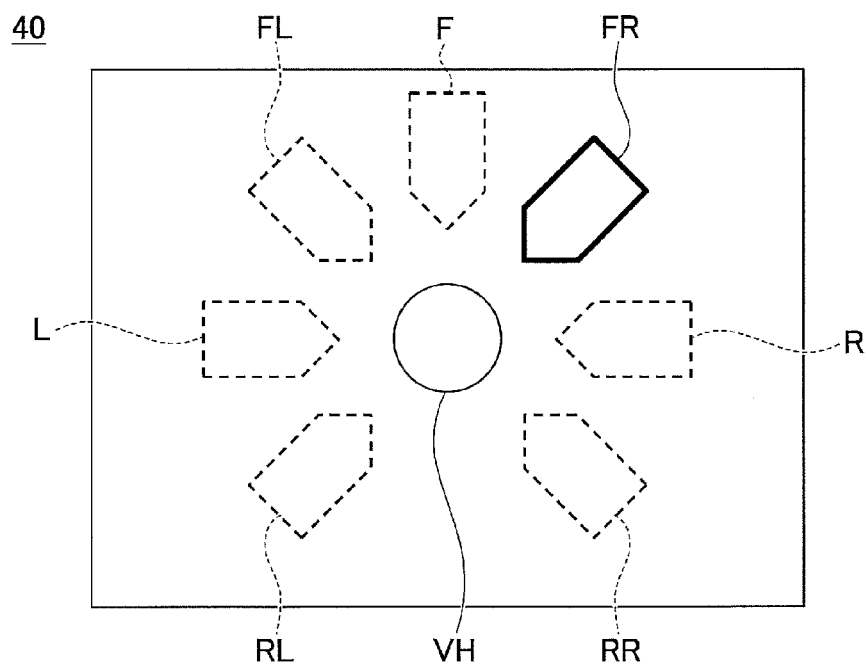
FIG. 3 is a diagram that illustrates an example of a method of indicating the existence area of the other vehicle.

In response to the display image signal transmitted from the indication control unit 37, the display 40 displays the direction in which the other vehicle 200 exists (the existence area determined by the existence area determination unit 36). The display image displayed by the display 40 (the display image to indicate the existence area of the other vehicle 200) will be described using FIG. 3. FIG. 3 is a diagram that illustrates an example of a method of indicating the existence area of the other vehicle 200, and more specifically illustrates an example of a form that displays on the display 40 an existence area as a direction in which the other vehicle exists. Note that what is displayed on the display 40 in the example shows that the "front right area" is the existence area of the other vehicle 200.

As illustrated in FIG. 3, a figure VH that represents the vehicle 100 is displayed in a center portion of a display area of the display 40. In addition, around the figure VH displayed in the center portion of the display 40, figures that represent respective existence areas are displayed: a figure F representing the front area; a figure FR representing the front right area; a figure R representing the right area; a figure RR representing the rear right area; a figure RL representing the rear left area; a FIG. 1 representing the left right area; and a figure FL representing the front left area.

Note that, among the figures in FIG. 3, figures designated by dotted lines (figure F, figure R, figure RR, figure RL, FIG. 1, and figure FL) are figures that are displayed when the existence area of the other vehicle 200 corresponds to the respective figures. Namely, in this example, since the existence area of the other vehicle 200 is the front right area, the figure FR that corresponds to the front right area is displayed, and the other figures are not displayed.

Also, as described above, if the existence area of the other vehicle 200 is the rear area, the direction (existence area) in which the following vehicle of the vehicle 100 exists is not displayed. Therefore, a figure that would correspond to the rear area is not displayed.

Referring to FIG. 1 again, in response to the sound signal transmitted from the indication control unit 37, the loudspeaker 50 outputs sound that indicates the direction in which the other vehicle 200 exists (the existence area determined by the existence area determination unit 36).

The various sensors 60 constitute a detection unit to detect motional states of the vehicle 100, and include the known vehicle speed sensor, the steering angle sensor, the yaw rate sensor, the direction sensor (to detect the head direction of the vehicle 100), and the like. The various sensors 60 are connected with the ECU 30 via an in-vehicle LAN or the like to communicate with each other, and transmit detected signals (a vehicle speed signal, a steering angle signal, a yaw rate signal, a directional signal, etc.) to the ECU 30.

The navigation device 70 is a route guidance unit to guide the driver through a route to a destination based on the position of the vehicle 100, the map information, traffic information (probe information and VICS (trademark)) that is received via a communication unit, and the like. The navigation device 70 generates a map image (route guidance image) based on the position of the vehicle 100 transmitted from the GPS receiver 20, and the map information that corresponds to the position of the vehicle 100 and the like, and has the display unit in the vehicle compartment display the image. Also, the navigation device 70 stores map information including information about roads (road information) in its internal storage device. The navigation device 70 is connected with the ECU 30 via an in-vehicle LAN or the like to communicate with each other, and transmits the map information (road information) that corresponds to the position of the vehicle 100 and the like to the ECU 30.

Next, a process will be described in detail that is executed by the information indication apparatus 1 (the ECU 30) according to the present embodiment, to indicate the direction in which the other vehicle 200 exists (information indication process).

First, using FIG. 4, an indication target determination process will be described that is executed by the ECU 30 (a process to determine whether the other vehicle 200 is a target to be indicated to the driver or the like of the vehicle 100 about its existence direction (existence area)).

Figure 4:
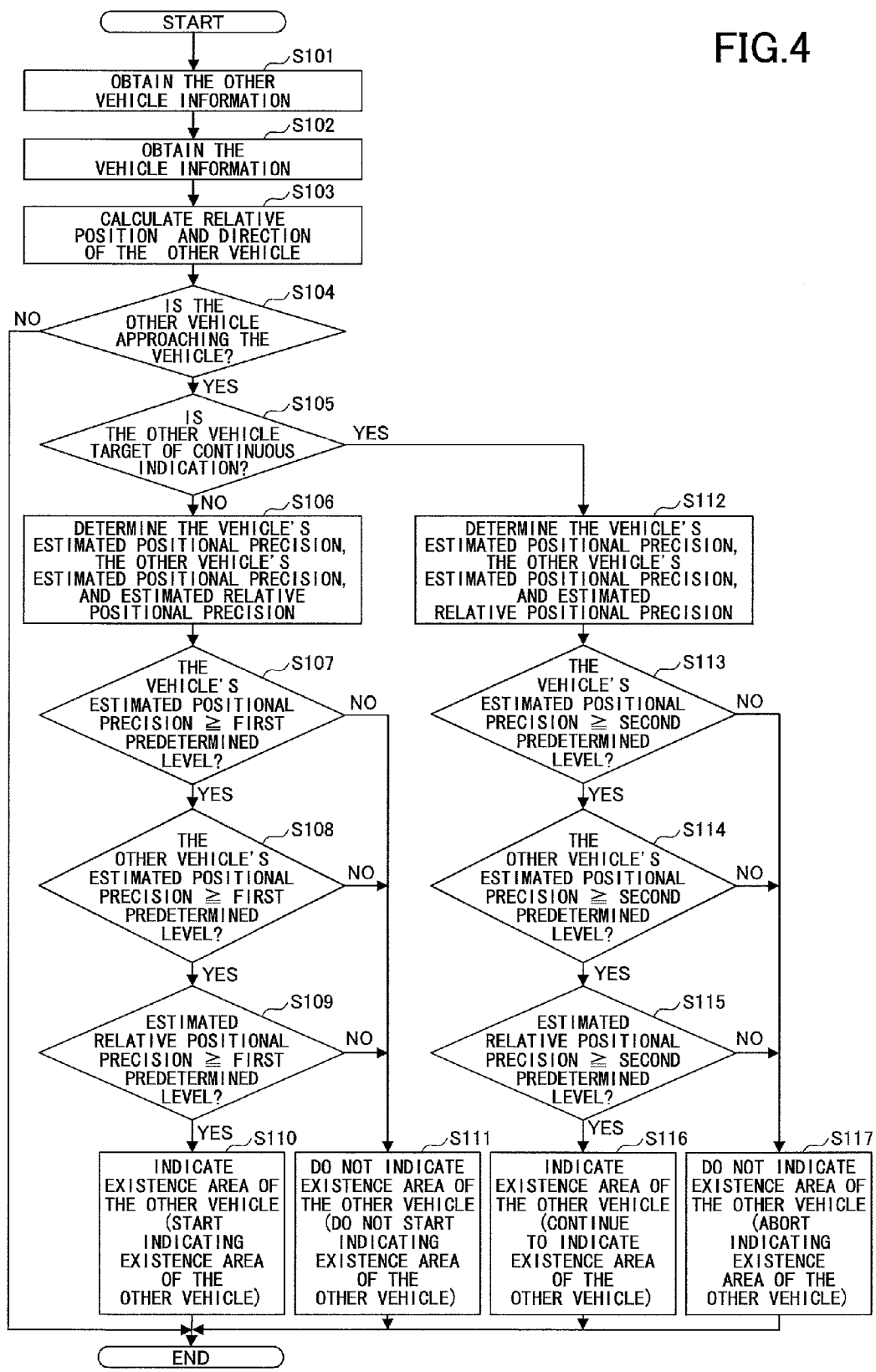
FIG. 4 is a flowchart that illustrates an example of an indication target determination process executed by an information indication apparatus (ECU) according to an embodiment of the present invention.

FIG. 4 is a flowchart that illustrates an example of the indication target determination process executed by the information indication apparatus 1 (the ECU 30) according to the present embodiment. The flowchart is executed every time another vehicle 200 capable of inter-vehicle communication is detected by the vehicle 100 (namely, every time the wireless device for inter-vehicle communication 10 can receive/transmit information with another vehicle 200).

At Step S101, the other vehicle information obtainment unit 32 obtains the other vehicle information (the other vehicle's positional information, the other vehicle's positional precision information, identification information, etc.).

At Step S102, the vehicle information obtainment unit 31 obtains the vehicle information (the vehicle's positional information, the vehicle's positional precision information, etc.).

At Step S103, the relative position calculation unit 33 calculates the relative position of the other vehicle 200 (the distance D between the vehicle 100 and the other vehicle 200, the direction of the other vehicle 200 as viewed from the vehicle 100, etc.).

At Step S104, the approach determination unit 34 determines whether the other vehicle 200 is approaching the vehicle 100. If the other vehicle 200 is approaching the vehicle 100, the approach determination unit 34 has the process go forward to Step S105; or if the other vehicle 200 is not approaching the vehicle 100, it has the current process end.

At Step S105, the indication control unit 37 determines whether the other vehicle 200 is a target of continuous indication, namely, whether it is the other vehicle 200 with which indication of the existence area has been started at Step S110 in the flowchart, as will be described later. If the other vehicle 200 is not a target of continuous indication, the indication control unit 37 has the process go forward to Step S106; or if it is a target of continuous indication, it has the process go forward to Step S112.

Note that since the other vehicle information received by the wireless device for inter-vehicle communication 10 includes identification information (ID) specific to the other vehicle 200, the indication control unit 37 can specifically determine whether the other vehicle 200 is a target of continuous indication by checking the identification information.

Steps S106 to S109 constitute a process flow to determine whether the other vehicle 200, with which indication of the existence area has not been started, is to be an indication target.

At Step S106, the positional precision determination unit 35 determines the vehicle's positional precision, the other vehicle's estimated positional precision, and the estimated relative positional precision, to determine whether they are greater than or equal to respective first predetermined levels in the following steps.

Note that a first predetermined level as a reference of positional precision may be specified as, for example, "a level that corresponds to an error within a first predetermined distance". Also, if multiple stepped positional precision levels are set corresponding to errors, the first predetermined level may correspond to one of the positional precision levels.

At Step S107, based on the determination result at Step S106, the positional precision determination unit 35 determines whether the vehicle's positional precision is greater than or equal to the first predetermined level. If the vehicle's positional precision is greater than or equal to the first predetermined level, the positional precision determination unit 35 has the process go forward to Step S108; or if the vehicle's positional precision is not greater than or equal to the first predetermined level, the positional precision determination unit 35 has the process go forward to Step S111.

At Step S108, based on the determination result at Step S106, the positional precision determination unit 35 determines whether the other vehicle's estimated positional precision is greater than or equal to the first predetermined level. If the other vehicle's estimated positional precision is greater than or equal to the first predetermined level, the positional precision determination unit 35 has the process go forward to Step S109; or if the other vehicle's estimated positional precision is not greater than or equal to the first predetermined level, the positional precision determination unit 35 has the process go forward to Step S111.

At Step S109, based on the determination result at Step S106, the positional precision determination unit 35 determines whether the estimated relative positional precision is greater than or equal to the first predetermined level. If the estimated relative positional precision is greater than or equal to the first predetermined level, the positional precision determination unit 35 has the process go forward to Step S110; or if the estimated relative positional precision is not greater than or equal to the first predetermined level, the positional precision determination unit 35 has the process go forward to Step S111.

Note that at Steps S106 to S109, for specific respective errors that correspond to the vehicle's positional precision, the other vehicle's estimated positional precision, and the estimated relative positional precision, it may be determined whether they are within respective first predetermined distances that correspond to the first predetermined levels. Also, at Step S107 to S109, to determine whether the estimated relative positional precision clears the first predetermined level, it is determined whether the precision of the estimated positions of the vehicle 100 and the other vehicle 200 clear the first predetermined levels, which is the base of the estimated relative position of the other vehicle 200. However, Steps S107 to S108 may be omitted, and only Step S109 may be executed.

At Step S110, the indication control unit 37 indicates the existence area of the other vehicle 200 through the display 40 and the loudspeaker 50. Namely, the indication control unit 37 starts indicating the existence area of the other vehicle 200.

On the other hand, at Step S111, the indication control unit 37 does not indicate the existence area of the other vehicle 200. Namely, the indication control unit 37 does not start indicating the existence area of the other vehicle 200.

In summary, the ECU 30 starts indicating the other vehicle 200 if the estimated relative positional precision is greater than or equal to the first predetermined level (clears the first predetermined level as the reference of positional precision).

On the other hand, the ECU 30 does not start indicating the other vehicle 200 if the estimated relative positional precision is not greater than or equal to the first predetermined level.

Also, Steps S112 to S115 constitute a process flow to determine whether the other vehicle 200, with which indication of the existence area has already been started, is still an indication target.

At Step S112, the positional precision determination unit 35 determines the vehicle's positional precision, the other vehicle's estimated positional precision, and the estimated relative positional precision, to determine whether they are greater than or equal to respective second predetermined levels in the following steps.

Note that second predetermined levels as references of the positional precision are set lower than the respective first predetermined levels described above. For example, assuming that a first predetermined level is a reference of the positional precision that corresponds to "a level of an error within a first predetermined distance", a second predetermined level is a reference of the positional precision that corresponds to "a level of an error within a second predetermined distance (>first predetermined distance)", which is a reference of the positional precision that allows a greater error than that is allowed with the first predetermined level.

At Step S113, based on the determination result at Step S112, the positional precision determination unit 35 determines whether the vehicle's positional precision is greater than or equal to the second predetermined level. If the vehicle's positional precision is greater than or equal to the second predetermined level, the positional precision determination unit 35 has the process go forward to Step S113; or if the vehicle's positional precision is not greater than or equal to the second predetermined level, the positional precision determination unit 35 has the process go forward to Step S117.

At Step S114, based on the determination result at Step S112, the positional precision determination unit 35 determines whether the other vehicle's estimated positional precision is greater than or equal to the second predetermined level. If the other vehicle's estimated positional precision is greater than or equal to the second predetermined level, the positional precision determination unit 35 has the process go forward to Step S115; or if the other vehicle's estimated positional precision is not greater than or equal to the second predetermined level, the positional precision determination unit 35 has the process go forward to Step S117.

At Step S115, based on the determination result at Step S112, the positional precision determination unit 35 determines whether the estimated relative positional precision is greater than or equal to the second predetermined level. If the estimated relative positional precision is greater than or equal to the second predetermined level, the positional precision determination unit 35 has the process go forward to Step S116; or if the estimated relative positional precision is not greater than or equal to the second predetermined level, the positional precision determination unit 35 has the process go forward to Step S117.

Note that at Steps S112 to S115, for specific respective errors that correspond to the vehicle's positional precision, the other vehicle's estimated positional precision, and the estimated relative positional precision, it may be determined whether they are within respective second predetermined distances that correspond to the second predetermined levels. Also, at Steps S113 to S115, to determine whether the estimated relative positional precision clears the second predetermined level, it is determined whether the precision of the estimated position of the vehicle 100 and the other vehicle 200 clear the second predetermined levels, which is the base of the estimated relative position of the other vehicle 200. However, Steps S113 to S114 may be omitted, and only Step S115 may be executed.

At Step S116, the indication control unit 37 indicates the existence area of the other vehicle 200 through the display 40 and the loudspeaker 50. Namely, the indication control unit 37 continues to indicate the existence area of the other vehicle 200.

On the other hand, at Step S117, the indication control unit 37 does not indicate the existence area of the other vehicle 200. Namely, the indication control unit 37 aborts indicating the existence area of the other vehicle 200.

In summary, the ECU 30 continues to indicate the other vehicle 200 if the estimated relative positional precision is greater than or equal to the second predetermined level (clears the second predetermined level as the reference of positional precision). On the other hand, the ECU 30 aborts indicating the other vehicle 200 if the estimated relative positional precision is not greater than or equal to the second predetermined level.

Note that "aborting" means to terminate indication of the existence area of the other vehicle 200, depending on degradation of the estimated relative positional precision at a certain stage while the other vehicle 200 is approaching the vehicle 100.

In this way, the information indication apparatus 1 according to the present embodiment does not indicate the existence area of the other vehicle 200 unless the estimated relative positional precision clears predetermined criteria (first predetermined level and second predetermined level) about positional precision. This makes it possible to guarantee that the precision is above a certain level for the existence area of the other vehicle 200, which is to be indicated to the driver or the like of the vehicle 100. Therefore, it is possible to prevent problems from being generated such that a false existence area of the other vehicle 200 (an existence area that is different from the existence area where the other vehicle 200 actually exists) is indicated, and the like.

Also, the information indication apparatus 1 according to the present embodiment sets the positional precision criterion (second predetermined level) to continue to indicate the direction in which the other vehicle 200 exists (existence area), lower (relaxed) than the positional precision criterion (first predetermined level) to start indicating the existence area. This makes it possible to guarantee a high-level precision criterion for the direction to be indicated as an existing direction of the other vehicle (first predetermined level), and also to avoid repeated hunting of indication and non-indication (aborting) after indication has been started.

Note that in the indication target determination process, one may consider whether precision is greater than or equal to a predetermined level for the estimated traveling directions of the vehicle 100 and the other vehicle 200 (the vehicle's estimated traveling direction precision, and the other vehicle's estimated traveling direction precision), which are based on the vehicle's estimated traveling direction precision information, and the other vehicle's estimated traveling direction precision information. Namely, when determining whether the other vehicle 200 is approaching the vehicle 100 at Step S104, the estimated traveling directions of the vehicle 100 and the other vehicle 200 are used. Therefore, if the precision of the estimated traveling directions of the vehicle 100 and the other vehicle 200 is inferior, it may be erroneously determined that the other vehicle 200 is approaching the vehicle 100. Therefore, for example, if at least one of the vehicle's estimated traveling direction precision, and the other vehicle's estimated traveling direction precision, is not greater than or equal to a predetermined level, the other vehicle 200 may be determined not to be set as an indication target, or the other vehicle 200 may be just set as an indication target for reference information.

Also, when the ECU 30 (the indication control unit 37) determines at Step S107 in the flowchart that the vehicle's positional precision is not greater than or equal to the first predetermined level, the ECU 30 does not start indicating existence areas with respect to all other vehicles 200 that are detected at the same time, but not targets of continuous indication. Also, when the ECU 30 (the indication control unit 37) determines at Step S113 in the flowchart that the vehicle's positional precision is not greater than or equal to the second predetermined level, the ECU 30 aborts indicating existence areas with respect to all other vehicles 200 that are detected at the same time, and are targets of continuous indication.

Next, using FIG. 5, an existence area indication process executed by the ECU 30 (a process that corresponds to Steps S110 to S116 in FIG. 4) will be described.

Figure 5:
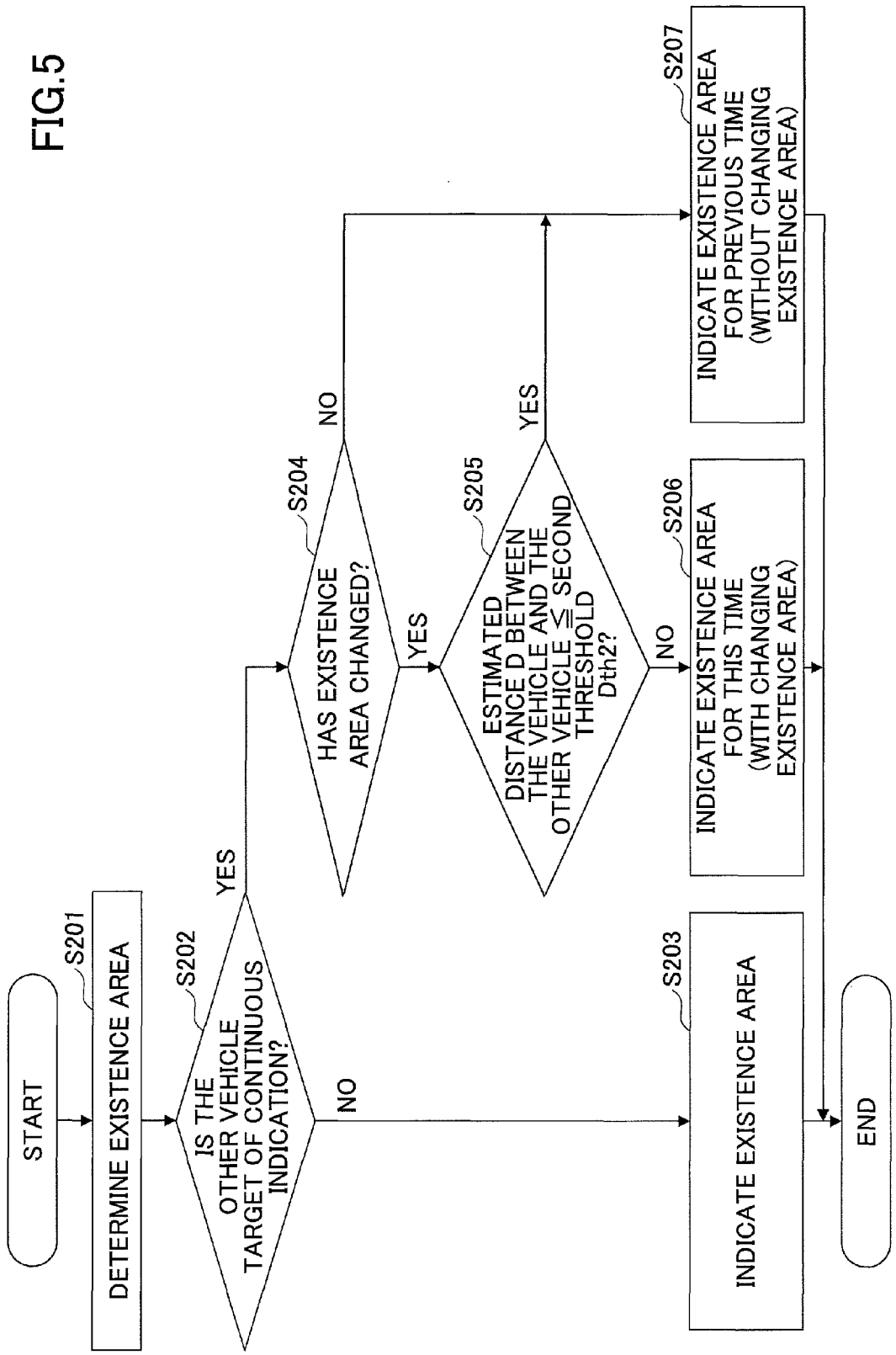
FIG. 5 is a flowchart that illustrates an example of an existence area indication process executed by an information indication apparatus (ECU) according to an embodiment of the present invention.

FIG. 5 is a flowchart that illustrates an example of the existence area indication process executed by the information indication apparatus 1 (the ECU 30) according to the present embodiment.

At Step S201, based on the relative position of the other vehicle 200 (estimated relative position of the other vehicle 200) calculated by the relative position calculation unit 33, the existence area determination unit 36 determines which of the eight existence areas described above ("front area", "front right area", "right area", "rear right area", "rear area", "rear left area", "left area", and, "front left area") corresponds to the direction in which the other vehicle 200 exists.

At Step S202, the indication control unit determines whether the other vehicle 200 is a target of continuous indication, namely, whether it is the other vehicle 200 with which indication of the existence area has been started at Step S203 in the flowchart, as will be described later. If the other vehicle 200 is not a target of continuous indication, the indication control unit 37 has the process go forward to Step S203; or if it is a target of continuous indication, it has the process go forward to Step S204.

In the following, Step S203 corresponds to Step S110 in FIG. 4, and Steps S204 to S207 correspond to Step S116 in FIG. 4.

At Step S203, the indication control unit 37 indicates the existence area determined at Step S201, through the display 40 and the loudspeaker 50, and ends the current process.

Also, at Step S204, the indication control unit 37 determines whether the existence area determined at Step S201 has been changed from the existence area that has been indicated by the process in the flowchart for the previous time. If the existence area has been changed, the indication control unit 37 has the process go forward to Step S205; or if the existence area has not been changed, it has the process go forward to Step S207.

At Step S205, the indication control unit 37 determines whether the estimated distance D between the vehicle 100 and the other vehicle 200 is less than or equal to a second threshold Dth2. If the estimated distance D between the vehicle 100 and the other vehicle 200 is not less than or equal to the second threshold Dth2, the indication control unit 37 has the process go forward to Step S206; or if the estimated distance D between the vehicle 100 and the other vehicle 200 is less than or equal to the second threshold Dth2, it has the process go forward to Step S207.

At Step S206, the indication control unit 37 indicates the existence area determined at Step S201 in the flowchart for this time, through the display 40 and the loudspeaker 50. Namely, the indication control unit 37 changes the existence area that has been indicated by the process in the flowchart for the previous time, to the existence area that is determined at Step S201 in the flowchart for this time, and indicates the changed existence area.

On the other hand, at Step S207, the indication control unit 37 continues to indicate the existence area that has been indicated by the process in the flowchart for the previous time, through the display 40 and the loudspeaker 50. Namely, the indication control unit 37 does not change the existence area to be indicated, which has been indicated by the process in the flowchart for the previous time.

In this way, the information indication apparatus 1 according to the present embodiment does not change the existence area to be indicated, even if the existence area of the other vehicle 200 changes as long as the estimated distance D between the vehicle 100 and the other vehicle 200 is less than or equal to the second threshold Dth2, which is set less than the first threshold Dth1.

Here, using FIG. 6, a situation will be described where the existence area indication process by the information indication apparatus 1 (the ECU 30) illustrated in FIG. 5, functions effectively.

Figure 6:
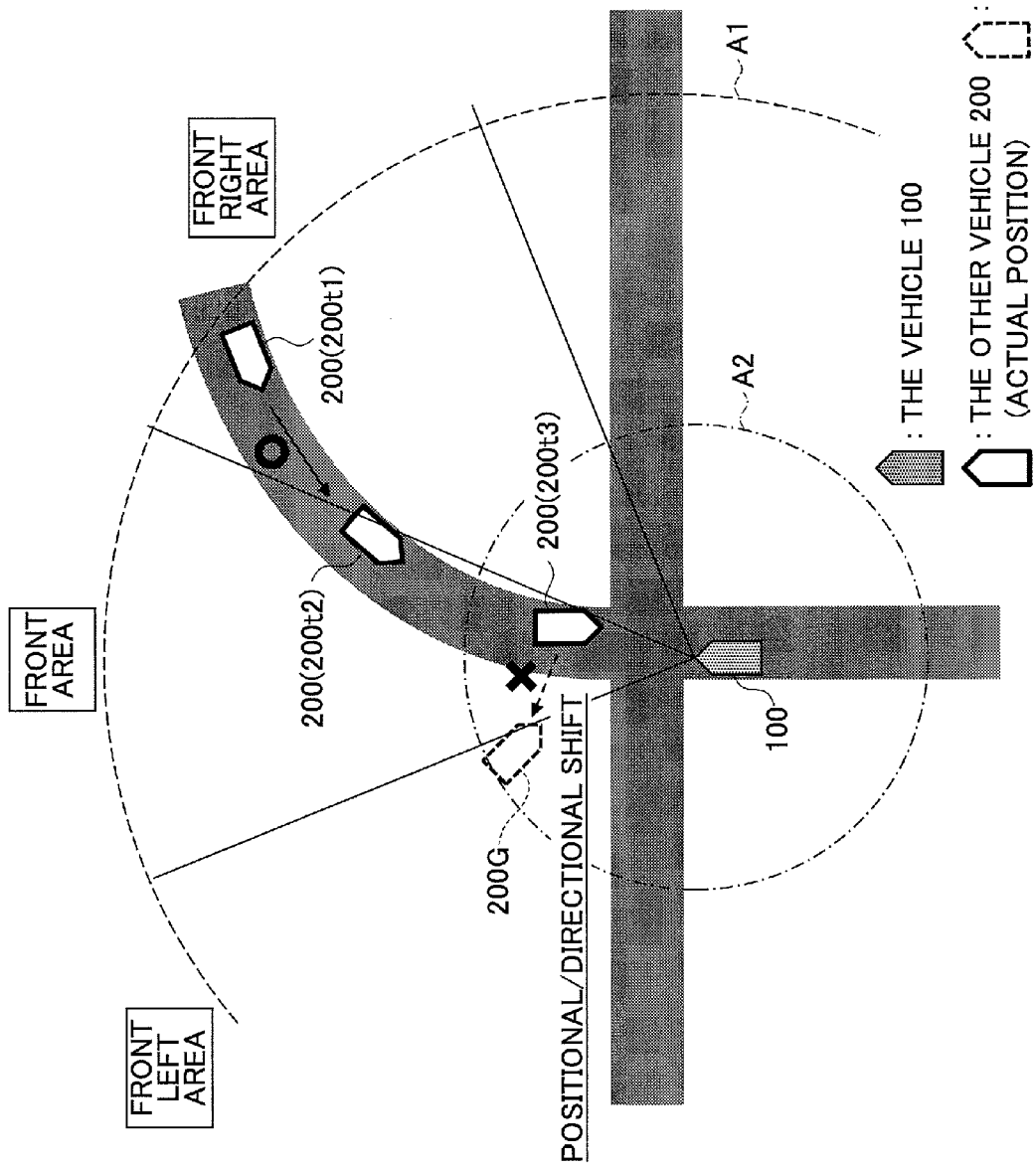
FIG. 6 is a diagram that illustrates operations of an information indication apparatus (ECU) according to an embodiment of the present invention.

FIG. 6 is a diagram that illustrates operations of an information indication apparatus 1 (the ECU 30) according to the present embodiment. Specifically, the figure illustrates a situation where the vehicle 100 stops at an intersection towards which the other vehicle 200 is traveling on a road that crosses the intersection, and is approaching the vehicle 100 on the front side.

Note that the other vehicle 200 is shown at times t1, t2, and t3 in the figure (the other vehicles 200t1, 200t2, and 200t3 in the figure), which represent a time series of the other vehicle 200 corresponding to the time t1, t2, and t3. Also, areas A1 and areas A2 having the vehicle 100 at the center correspond to an area where the estimated distance D between the vehicle 100 and the other vehicle 200 is less than or equal to the first threshold Dth1, and an area where the estimated distance D is less than or equal to the second threshold Dth2, respectively. Also, it is assumed at time t1 that the vehicle's positional precision, the other vehicle's estimated positional precision, and the estimated relative positional precision are greater than or equal to the first predetermined levels. Also, it is assumed at times t2 and t3 that the vehicle's positional precision, the other vehicle's estimated positional precision, and the estimated relative positional precision are greater than or equal to the second predetermined levels.

Referring to FIG. 6, at time t1, the other vehicle 200 enters the area A1, in a state of traveling towards the vehicle 100 (the estimated distance D between the vehicle 100 and the other vehicle 200 is now less than or equal to the first threshold Dth1). Therefore, the ECU 30 starts indicating the existence area of the other vehicle 200 through the display 40 and the loudspeaker 50. In this situation, the road on which the other vehicle 200 is traveling (the other vehicle's traveling road) has a curve in the right front direction as viewed from the connected intersection at which the vehicle 100 stops. Therefore, at this moment, the other vehicle 200 cannot be visually recognized from the vehicle 100, and the "front right area" is indicated as the existence area of the other vehicle 200.

Between time t1 and time t2, the other vehicle 200 further approaches the intersection. At time t2, the existence area of the other vehicle 200 is changed from "front right area" to "front area", and the other vehicle 200 can now be visually recognized from the vehicle 100. At this moment, since the other vehicle 200 is outside of the area A2 (the estimated distance D between the vehicle 100 and the other vehicle 200 is not less than or equal to the second threshold Dth2), the ECU 30 changes and indicates the existence area of the other vehicle 200 (from "front right area" to "front area", see a circle mark in the figure).

Between time t2 and time t3, the other vehicle 200 further approaches the intersection. At time t3, the other vehicle 200 reaches the intersection. Here, at time t3, the estimated relative positional precision is degraded (lower than the first predetermined level), and the ECU 30 erroneously recognizes the position and traveling direction of the other vehicle 200, namely, recognizes (calculates) them as designated by the other vehicle 200G in the figure. In this case, the ECU 30 recognizes the direction in which the other vehicle 200G exists as "front left area", which is changed from "front area" or the existence area at time t2. However, since the other vehicle 200G recognized by the ECU 30 is in the area A2 (the estimated distance D between the vehicle 100 and the other vehicle 200G is less than or equal to the second threshold Dth2), the ECU 30 does not change the existence area of the other vehicle 200, and continues to indicate "front area" (X mark in the figure).

In this way, if the other vehicle's traveling road is a curved road, the driver or the like of the vehicle 100 cannot visually recognize the other vehicle 200 unless the other vehicle 200 comes close to the vehicle 100 to a certain extent. Therefore, if the other vehicle 200 is outside of the area A2, the information indication apparatus 1 according to the present embodiment changes the existence area to be indicated in accordance with a change of the existence area so that the driver can recognize a correspondence between the other vehicle 200 that is now visually recognizable and the other vehicle 200 whose existence area has been indicated up until now.

Also, if the other vehicle 200 is in the area A2, it is highly likely that the driver or the like of the vehicle 100 can already visually recognize the other vehicle 200, and less likely that the existence area of the other vehicle 200 changes. Therefore, if the existence area to be indicated is changed, it may give the driver a sense of discomfort, or the driver misunderstands that a vehicle is coming other than the visible one (the other vehicle 200), and may pay insufficient attention to the other vehicle 200. Therefore, if the other vehicle 200 is in the area A2, the information indication apparatus 1 according to the present embodiment does not change the existence area to be indicated even if the existence area of the other vehicle 200 changes, to solve such a problem.

Also, as described with FIG. 4, the information indication apparatus 1 according to the present embodiment does not start indicating the existence area of the other vehicle 200 if the estimated relative positional precision is not greater than or equal to the first predetermined level. Namely, after indication has been started for the existence area of the other vehicle 200, in a situation where the other vehicle 200 is in the area A2, if the existence area of the other vehicle 200 changes, it is highly likely that the estimated relative positional precision is degraded, and the ECU 30 erroneously recognizes the position of the other vehicle 200. Therefore, the information indication apparatus 1 according to the present embodiment does not change the existence area to be indicated if the other vehicle 200 is in the area A2. This make it possible to securely avoid erroneous indication, namely, to avoid that a false existence area of the other vehicle 200 (an existence area different from the actual existence area of the other vehicle 200) is indicated to the driver or the like of the vehicle 100, after indication has been started for the other vehicle 200.

Next, using FIG. 7, an existence area indication end process (a process to end indication of the existence area of the other vehicle 200) will be described that is executed by the information indication apparatus 1 according to the present embodiment (the ECU 30).

Figure 7:
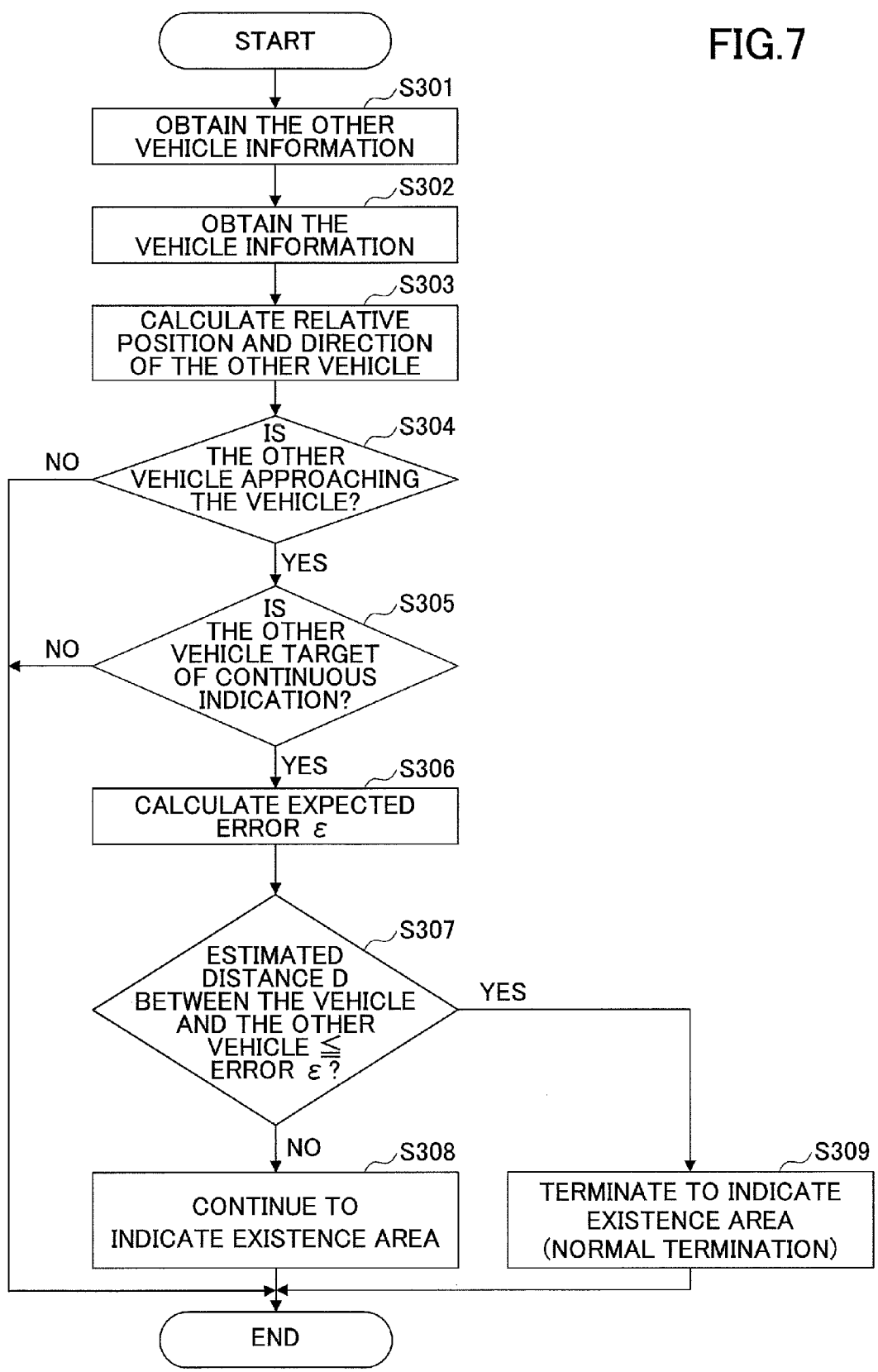
FIG. 7 is a flowchart that illustrates an example of an existence area indication end process executed by an information indication apparatus (ECU) according to an embodiment of the present invention.

FIG. 7 is a flowchart that illustrates an example of an existence area indication end process executed by the information indication apparatus 1 (the ECU 30) according to the present embodiment. The flowchart is executed every time another vehicle 200 capable of inter-vehicle communication is detected by the vehicle 100 (namely, every time the wireless device for inter-vehicle communication 10 can receive/transmit information with another vehicle 200). Namely, the flowchart is executed in parallel with the existence area indication target determination process illustrated in FIG. 4.

At Step S301, the other vehicle information obtainment unit 32 obtains the other vehicle information (the other vehicle's positional information, the other vehicle's positional precision information, identification information, etc.).

At Step S302, the vehicle information obtainment unit 31 obtains the vehicle information (the vehicle's positional information, the vehicle's positional precision information, etc.).

At Step S303, the relative position calculation unit 33 calculate the relative position of the other vehicle 200 (the distance D between the vehicle 100 and the other vehicle 200, the direction of the other vehicle 200 as viewed from the vehicle 100, etc.).

At Step S304, the approach determination unit 34 determines whether the other vehicle 200 is approaching the vehicle 100. If the other vehicle 200 is approaching the vehicle 100, the approach determination unit 34 has the process go forward to Step S305; or if the other vehicle 200 is not approaching the vehicle 100, it has the current process end.

At Step S305, the indication control unit determines whether the other vehicle 200 is a target of continuous indication, namely, whether it is the other vehicle 200 with which indication of the existence area has been started by the process flow in FIG. 4 and FIG. 5 described above. If the other vehicle 200 is a target of continuous indication, the indication control unit 37 has the process go forward to Step S306; or if it is not a target of continuous indication, it has the current process end.

At Step S306, based on the estimated relative positional precision, the positional precision determination unit 35 calculates an expected error $\epsilon$ (a third threshold Dth3) for the estimated distance D between the vehicle 100 and the other vehicle 200.

Note that the error $\epsilon$ takes a value less than the second threshold Dth2 described above. Namely, the second predetermined level described above, which corresponds to the condition to continue indication of the existence area of the other vehicle 200, is set as a reference of positional precision with which the error takes a value less than the second threshold Dth2.

At Step S307, the indication control unit determines whether the estimated distance D between the vehicle 100 and the other vehicle 200 is less than or equal to the error s (third threshold Dth3). If the estimated distance. D between the vehicle 100 and the other vehicle 200 is not less than or equal to the error $\epsilon$, it has the process go forward to Step S308; or if the estimated distance D between the vehicle 100 and the other vehicle 200 is less than or equal to the error $\epsilon$, it has the process go forward to Step S309.

At Step S308, the indication control unit 37 continues to indicate the existence area of the other vehicle 200. Namely, the indication control unit 37 continues to indicate the existence area of the other vehicle 200 by the process in the flowchart of FIG. 4 and FIG. 5, which is processed in parallel with this flowchart.

On the other hand, at Step S309, the indication control unit 37 stops indicating the existence area of the other vehicle 200 (normal termination). Namely, the indication control unit 37 stops indicating the existence area of the other vehicle 200 by the process in the flowchart of FIG. 4 and FIG. 5, which has been processed in parallel with the flowchart.

Note that as a specific process corresponding to Step S309, the indication control unit 37 may not execute the process in the flowchart of FIG. 4 and FIG. 5 for the other vehicle 200, or may execute a process to block indication of the existence area of the other vehicle 200 based on the process in the flowchart of FIG. 4 and FIG. 5. Also, "normal termination" is used for differentiating with "aborting" described above, and means to terminate indication of the existence area of the other vehicle 200 based on the process in this flowchart.

In this way, if the estimated distance D between the vehicle 100 and the other vehicle 200 is less than or equal to the error $\epsilon$, the information indication apparatus 1 according to the present embodiment stops indicating the existence area of the other vehicle 200 (stops a drive support of the other vehicle 200).

Here, using FIG. 8, a situation will be described in which the existence area indication end process by the information indication apparatus 1 (the ECU 30) illustrated in FIG. 7, functions effectively.

FIG. 8 is a diagram that illustrates operations of the information indication apparatus the (the ECU 30) according to the present embodiment. Specifically, it illustrates a situation in which the vehicle 100 temporarily stops at a T-shaped intersection, and the other vehicle 200 coming from the left relative to the vehicle 100 is passing the intersection to the right.

Note that it is assumed in FIG. 8 that the vehicle's positional precision, the other vehicle's estimated positional precision, and the estimated relative positional precision are greater than or equal to the second predetermined levels.

Referring to FIG. 8, the other vehicle 200 has already reached the intersection, and is in a state where the distance to the vehicle 100 is about zero. However, the estimated relative positional precision is degraded (less than the first predetermined level), and the ECU 30 erroneously recognizes the position of the other vehicle 200, namely, recognizes (calculates) it as designated by the other vehicle 200G in the figure.

The amount of shift between the position of the other vehicle 200G (the estimated position of the other vehicle 200) and the actual position of the other vehicle 200 (nearly equivalent to the position of the vehicle 100) corresponds to, at the maximum, the error $\epsilon$ between the vehicle 100 and the other vehicle 200 described above. Therefore, if the estimated distance D between the vehicle 100 and the other vehicle 200 is less than or equal to the error $\epsilon$, the information indication apparatus 1 according to the present embodiment stops indicating the existence area of the other vehicle 200, and hence, can stop indicating the existence area of the other vehicle 200 before the other vehicle 200 passes around the vehicle 100.

For example, if the other vehicle 200 has already passed in front of the vehicle 100, but an indication is made that the other vehicle 200 is coming from the left (indicating "left area" as the existence area), it may give a sense of discomfort to the driver of the vehicle 100 who has visually observed that the other vehicle 200 has passed. Also, if the other vehicle 200 has already passed in front of the vehicle 100, but an indication is made that the other vehicle 200 is coming from the left (indicating "left area" as the existence area), the driver of the stopped vehicle 100 may not dare to start the vehicle 100 immediately, which may disturb traffic flow.

However, the information indication apparatus 1 according to the present embodiment can avoid an occurrence of such problems, by stopping indicating the existence area of the other vehicle 200 if the estimated distance D between the vehicle 100 and the other vehicle 200 is less than or equal to the error $\epsilon$.

Note that instead of the error s of the estimated distance D between the vehicle 100 and the other vehicle 200, another value may be used that is appropriately set depending on the estimated relative positional precision. For example, since it is sufficient to stop indicating the existence area of the other vehicle 200 before the other vehicle 200 passes around the vehicle 100, another value may be used that is obtained by adding a margin to the error $\epsilon$, instead of the error $\epsilon$. Also, since the error of the estimated distance D between the vehicle 100 and the other vehicle 200 may be different depending on a direction in which the other vehicle 200 exists as viewed from the vehicle 100, another value may be used that is set depending on the estimated relative positional precision (or a relationship between the direction in which the other vehicle 200 exists and the error included in it) instead of the error $\epsilon$. The other value is set less than the second threshold Dth2 described above.

Also, for example, if the vehicle 100 stops at an intersection, passing around the vehicle 100 means passing the intersection. Therefore, instead of the estimated distance D between the vehicle 100 and the other vehicle 200, the distance between the other vehicle 200 and the intersection may be used. Namely, if the distance between the other vehicle 200 and the intersection is less than or equal to the error, indication of the existence area of the other vehicle 200 may be stopped. In this case, the ECU 30 may obtain the position of the intersection based on road information transmitted from the navigation device 70. Also, an error expected on the distance between the other vehicle 200 and the intersection mostly depends on the other vehicle's estimated positional precision. Therefore, the ECU 30 may calculate the error expected on the distance between the other vehicle 200 and the intersection, based on the other vehicle's estimated positional precision. This makes it possible to obtain substantially the same operations and effects.

The embodiments of the present invention have been described in detail. Note that the present invention is not limited to the above specific embodiments, but various changes, substitutions, and alterations could be made without departing from the spirit and scope of the invention.

The present application is based on and claims the benefit of priority of Japanese Priority Application No. 2014-230969, filed on Nov. 13, 2014, the entire contents of which are hereby incorporated by reference.

The invention claimed is:

1. An information indication apparatus, configured to be installed in a vehicle, comprising:
   a vehicle's information obtainment unit configured to obtain positional information of the vehicle, including a position and a traveling direction of the vehicle;
   another vehicle's information obtainment unit configured to obtain positional information of the other vehicle, including a position and a traveling direction of the other vehicle, by inter-vehicle communication with the other vehicle;
   a relative position calculation unit configured, based on the vehicle's positional information and the other vehicle's positional information, to calculate a relative position of the other vehicle relative to the vehicle, the relative position including a distance between the vehicle and the other vehicle, and a direction in which the other vehicle exists as viewed from the vehicle; and an indication unit configured to indicate, among a plurality of predetermined areas each of which is represented by a range of directional angles as viewed from the vehicle, one of the predetermined areas including the direction in which the other vehicle exists, when the distance is less than or equal to a predetermined first threshold, and the other vehicle is traveling towards the vehicle;

wherein when the distance is less than or equal to a predetermined second threshold set to be less than the predetermined first threshold, the indication unit does not change the one of the predetermined areas to be indicated even if the direction in which the other vehicle exists changes to be included in another of the predetermined areas.

2. The information indication apparatus, as claimed in claim 1, wherein the vehicle's information obtainment unit obtains positional precision information about the vehicle relating to precision of the position of the vehicle included in the vehicle's positional information, the other vehicle's information obtainment unit obtains positional precision information about the other vehicle relating to precision of the position of the other vehicle included in the other vehicle's positional information, and the indication unit starts indicating the one of the predetermined areas including the direction in which the other vehicle exists, when determining that the precision of the relative position calculated by the relative position calculation unit is greater than or equal to a predetermined level, based on the positional precision information about the vehicle and the positional precision information about the other vehicle.

3. The information indication apparatus, as claimed in claim 2, wherein the indication unit does not indicate the one of the predetermined areas including the direction in which the other vehicle exists when the distance is less than or equal to a predetermined third threshold set to be less than the predetermined second threshold, depending on the precision of the relative position.

* * * * *